United States Patent [19]

Song

[11] Patent Number: 5,787,067
[45] Date of Patent: Jul. 28, 1998

[54] OPTICAL PICK-UP APPARATUS

[75] Inventor: Ki-Seog Song, Seoul, Rep. of Korea

[73] Assignee: Daewoo Electronics Co., Ltd., Seoul, Rep. of Korea

[21] Appl. No.: 971,965

[22] Filed: Nov. 17, 1997

Related U.S. Application Data

[63] Continuation of Ser. No. 624,219, Mar. 29, 1996, abandoned.

[30] Foreign Application Priority Data

Mar. 31, 1995 [KR] Rep. of Korea ............... 95-6275 U
Mar. 31, 1995 [KR] Rep. of Korea ............... 1995-7427

[51] Int. Cl.$^6$ .................................................. G11B 21/16
[52] U.S. Cl. ............................................................ 369/247
[58] Field of Search ..................................... 369/215, 219, 369/247, 44.14, 44.15, 44.16

[56] References Cited

U.S. PATENT DOCUMENTS

| | | | |
|---|---|---|---|
| 4,696,566 | 9/1987 | Sekimoto et al. | 350/255 |
| 4,745,589 | 5/1988 | Nomura | 369/45 |
| 5,161,067 | 11/1992 | Tomiyama et al. | 359/824 |
| 5,208,703 | 5/1993 | Ikegame et al. | 359/813 |
| 5,216,648 | 6/1993 | Noda et al. | 369/44.14 |
| 5,220,459 | 6/1993 | Ichikawa et al. | 359/811 |
| 5,243,584 | 9/1993 | Kang | 369/44.14 |
| 5,337,865 | 8/1994 | Kasahara et al. | 188/378 |
| 5,428,481 | 6/1995 | Ikegame et al. | 359/811 |
| 5,475,661 | 12/1995 | Tomita et al. | 369/44.16 |

FOREIGN PATENT DOCUMENTS 0660312  12/1994  European Pat. Off. .

OTHER PUBLICATIONS

*Patent Abstracts of Japan.* Publication No. JP5197983; Publication Date: Aug. 6, 1993; Application No.: JP920282783; Application Date: Oct. 21, 1992; vol. 17, No. 624 (P–1646), Patent No. A 5197983; Patent Date: Aug. 6, 1993; Inventor: Ishida Tomoyuki; et al.; Title: Optical Head Device for Disk Player.

*Primary Examiner*—Stuart S. Levy
*Assistant Examiner*—William J. Klimowicz
*Attorney, Agent, or Firm*—Beveridge, DeGrandi, Weilacher & Young, LLP

[57]  ABSTRACT

An optical pick-up apparatus has a damper which absorbs an external shock to prevent movement or shake of an objective lens and enhances a driving characteristic of the objective lens. The damper connects a yoke plate and an objective lens holder, absorbs the external shock to prevent the movement or shake of the objective lens, and reinforces a driving force of the objective lens in the focusing and/or tracking direction (s), thereby improving the focusing and tracking characteristics of the objective lens.

9 Claims, 8 Drawing Sheets

OPTICAL PICK-UP APPARATUS

This application is a continuation of application Ser. No. 08/624,219, now abandoned, filed Mar. 29, 1996, which application is entirely incorporated herein by reference.

BACKGROUND OF THE INVENTION

1. Field of the Invention

The present invention relates to an optical pick-up apparatus of a disc player, and more particularly to an optical pick-up apparatus capable of absorbing an external shock and enhancing the driving sensitivity of an actuator.

2. Description of the Prior Art

An optical pick-up is an apparatus for recording information on an optical disc or reading out the recorded information from the optical disc by using a laser beam in an optical disc player system. Generally, the optical pick-up includes a light source for producing the laser beam, a beam splitter for directing the laser beam emitted from the light source toward an objective lens which focuses the laser beam on the surface of an optical disc and a light receiving element for receiving the laser beam reflected from the surface of the optical disc.

Information tracks in which information is recorded thereon are concentrically or spirally formed in the interval of approximately 1.6 μm, and the optical pick-up emits the laser beam on the information track to enable the recording of data on a predetermined position of the optical disc or the reproducing of the data from the predetermined position.

In order to accurately record and reproduce the data, a focusing control and a tracking control should be executed. In other words, the optical pick-up should emit the optical beam onto the information track to trace the information track. Thus, an optical pick-up utilizes the beam reflected from the information track to detect a servo error signal which includes a focusing error signal and a tracking error signal, and then, based upon the detected servo error signal, drives an actuator for forcing the objective lens to move in the focusing and tracking directions.

As shown in FIG. 1, a conventional optical pick-up 10 includes a base 52, and a yoke plate 44 attached with a suspension support plate 46. Also, an objective lens holder 14 which suspends over suspension support plate 46 of yoke plate 44 by means of suspensions 50 supports an objective lens 12.

A laser beam thruhole is formed at the center of base 52 to allow the laser beam to pass therethrough, and a rack 54 which is engaged with a driving apparatus (not shown) is formed in one side of base 52 for permitting base 52 to move by the driving apparatus.

A laser beam thruhole 45 is formed at the center of yoke plate 44, and a pair of inner yokes 38 and 40 and a pair of outer yokes 36 and 42 are respectively arranged to be opposite each other. Focusing control coils 24 and 26 are externally inserted to inner yokes 38 and 40, respectively. Permanent magnets 32 and 34 are arranged adjacently to outer yokes 36 and 42 between inner yokes 38 and 40 and outer yokes 36 and 42, respectively. Also, tracking control coils 28 and 30 are arranged between focusing control coils 24 and 26 and permanent magnets 32 and 34. Suspension support plate 46 is attached to one end of yoke plate 44, and an end plate 48 is attached to the rear plane of suspension support plate 46. Apertures are formed in four corners of suspension support plate 46 and end plate 48.

A laser beam thruhole 15 is formed at the center of objective lens holder 14. By arranging objective lens 12 over objective lens holder 14, the laser beam incident from the light source via the laser beam thruhole passes through objective lens 12 to be emitted upon the recording layer of the disc.

A plurality of suspensions 50 which are molded by using conductive materials are conductive rods which allow for electrical communication for being supplied with current from the end plate 48 to transmit it to objective lens holder 14. One end of each respective suspension 50 penetrates through the suspension support plate to be fixed to the end plate, and each other end is fixed to support pieces 16 and 18. Objective lens holder 14 is supported by end plate 48, using suspensions 50.

In association with the above-described construction, when the current is supplied via suspensions 50 and inner yokes 38 and 40, the current is supplied to objective lens holder 14 via suspensions 50. By the interaction with objective lens holder 14, induced current flows through the focusing coils 24 and 26 and tracking coils 28 and 30. At this time, the focusing control of objective lens 12 is carried out by the interaction of the permanent magnets 32 and 34 and focusing control coils 24 and 26, and the tracking control of objective lens 12 is accomplished by the interaction of the permanent magnets 32 and 34 and objective lens 12.

However, if an excess amount of the current is applied to focusing control coils 24 and 26 or tracking control coils 28 and 30, objective lens 12 is extremely moved in the tracking or focusing direction. In addition, an external shock probably jolts objective lens 12 side to side or up and down. Typically, in order to solve the foregoing problems, a gap between the respective apertures of support plate 46 and suspensions 50 has been heretofore filled with a gel which contains silicon, etc.

Moreover, the above-described apparatus has the drawbacks of involving fastidious dealing of the damping gel and difficulty in injecting the damping gel into the gap between the apertures formed in support plate 46 and suspensions 50.

For solving the above drawbacks, as shown in FIG. 2, objective lens holder 14 is connected with the outermost yoke 36 of yoke plate 44 by means of dampers 20 and 22.

But the conventional dampers 20 and 22 are linearly shaped to serve damper function solely without improving the driving sensitivity of objective lens holder 14 during the focusing control or tracking control.

Furthermore, in order to enhance the focusing and tracking actuating forces of objective lens 12 in the conventional optical pick-up apparatus, it is required to increase the winding number of the focusing and tracking coils and thicken the permanent magnet or yoke which induces the interaction with the focusing coil or tracking coil. But the increased winding number or size of the permanent magnet makes the optical pick-up bulky.

U.S. Pat. No. 5,243,584 issued to Dong J. Kang on Sep. 7, 1993, discloses an optical pick-up unit capable of preventing movement or shaking of an objective lens caused by an external shock or acceleration.

Kang's optical pick-up unit includes a support member fixed to a base plate while having a spring, and a tracking damper having one end fixed to the support member and the other end fixed to a tracking damper support member for absorbing a vibration energy during a tracking operation. Also, a supporting element is inserted into an insertion hole of the tracking damper support member to be supported by a pair of pins, thereby absorbing the vibration energy while the tracking is changed.

Kang's optical pick-up unit is equipped with the tracking damper and supporting element to prevent the objective lens from being moved or shaken due to the external shock or acceleration.

However, the parts such as the supporting element, pin and spring are needed for preventing the movement and shaking of the objective lens to result in a bulky optical pick-up which, in turn, involves a demanding assembling job.

SUMMARY OF THE INVENTION

Therefore, it is an object of the present invention to provide an optical pick-up apparatus capable of facilitating the mounting thereof, absorbing an external shock to prevent shaking of an objective lens and enhancing a driving characteristic of the objective lens.

To achieve the above-described object, an optical pick-up apparatus according to the present invention comprises:

a holder formed with a first beam thruhole at a center thereof, formed with first and second vertical mounting grooves in centers of both sides, and mounted with an objective lens into the first beam thruhole;

an actuator having focusing coils for driving the holder in a focusing direction, tracking coils for actuating the holder in a tracking direction, permanent magnets for interacting with the focusing coils and tracking coils, and yokes for providing magnetic paths between the focusing coils and the tracking coils;

a yoke plate one end thereof for supporting the holder to one end thereof, which is formed with a second beam thruhole coaxially with the first beam thruhole in the center thereof, for supporting the focusing coils and the tracking coils mounted on an upper plane thereof spaced apart from each other by a predetermined distance;

suspensions for supporting the holder, the suspensions being fixed to a damping yoke of the yoke plate at one end thereof and connected to the holder at the other end thereof; and a damping means for applying compressed force to suspensions and for preventing the holder from being vibrated, the damping means being mounted between the holder and the damping yoke of the yoke plate.

According to a first embodiment of the present invention, the damping means comprises a first support piece having a first latch at a center of one side, the first support piece being mounted into a first vertical mounting groove; a second support piece having a second latch at the center of one side, the second support piece being mounted into a second vertical mounting groove; a damping yoke having a first projection groove at an upper end of one side and a second projection groove at an upper end of other side, the damping yoke being secured to one end of the yoke plate; a first damper being formed with a first latching hole at a first end, and a first projection at a second end; and a second damper being formed with a second latching hole at a first end, and a second projection at a second end, wherein the first latch is inserted into the first latching hole of the first damper, the first projection is connected with the first projection groove, the second latch is inserted into the second latching hole of the second damper, and the second projection is connected with the second projection groove.

According to a second embodiment of the present invention, the damping means comprises; a first support piece having a third latch at a center of one side, the third support piece being mounted into a first vertical mounting groove; a fourth support piece having a second latch at the center of one side, the second support piece being mounted into a second vertical mounting groove; a damping yoke having a first projection hole at an upper edge of one side and a second projection hole at an upper edge of other side, the damping yoke being secured to one end of the yoke plate; a first damper being formed with a first latching hole at a first end, and a first projection at a second end; and a second damper being formed with a second latching hole at a first end, and a second projection at a second end, wherein the first latch is inserted into the first latching hole of the first damper, the first projection is inserted into the first projection hole of the damping yoke, the second latch is inserted into the second latching hole of the second damper, and the second projection is inserted into the second projection hole of the second damping yoke.

The first damper is mounted in a compressed state between the first support piece and the damping yoke, and the second damper is installed in a compressed state between the second support piece and the damping yoke, thereby having compressed force being applied to the suspensions.

When the current is supplied to the holder and then the holder moves in a focusing and/or tracking direction, the first and second damper providing the compressed force for the suspensions applies force to the suspensions in the bending direction. In result, as the focusing and/or tracking velocities of the holder increase, focusing and/or tracking performances of objective lens are improved.

BRIEF DESCRIPTION OF THE DRAWINGS

The above objects and other advantages of the present invention will become more apparent by describing in detail preferred embodiments thereof with reference to the attached drawings in which.

DESCRIPTION OF THE PREFERRED EMBODIMENTS

Hereinbelow, preferred embodiments of the present invention will be described in detail with reference to accompanying drawings.

Embodiment 1

Figure 1:
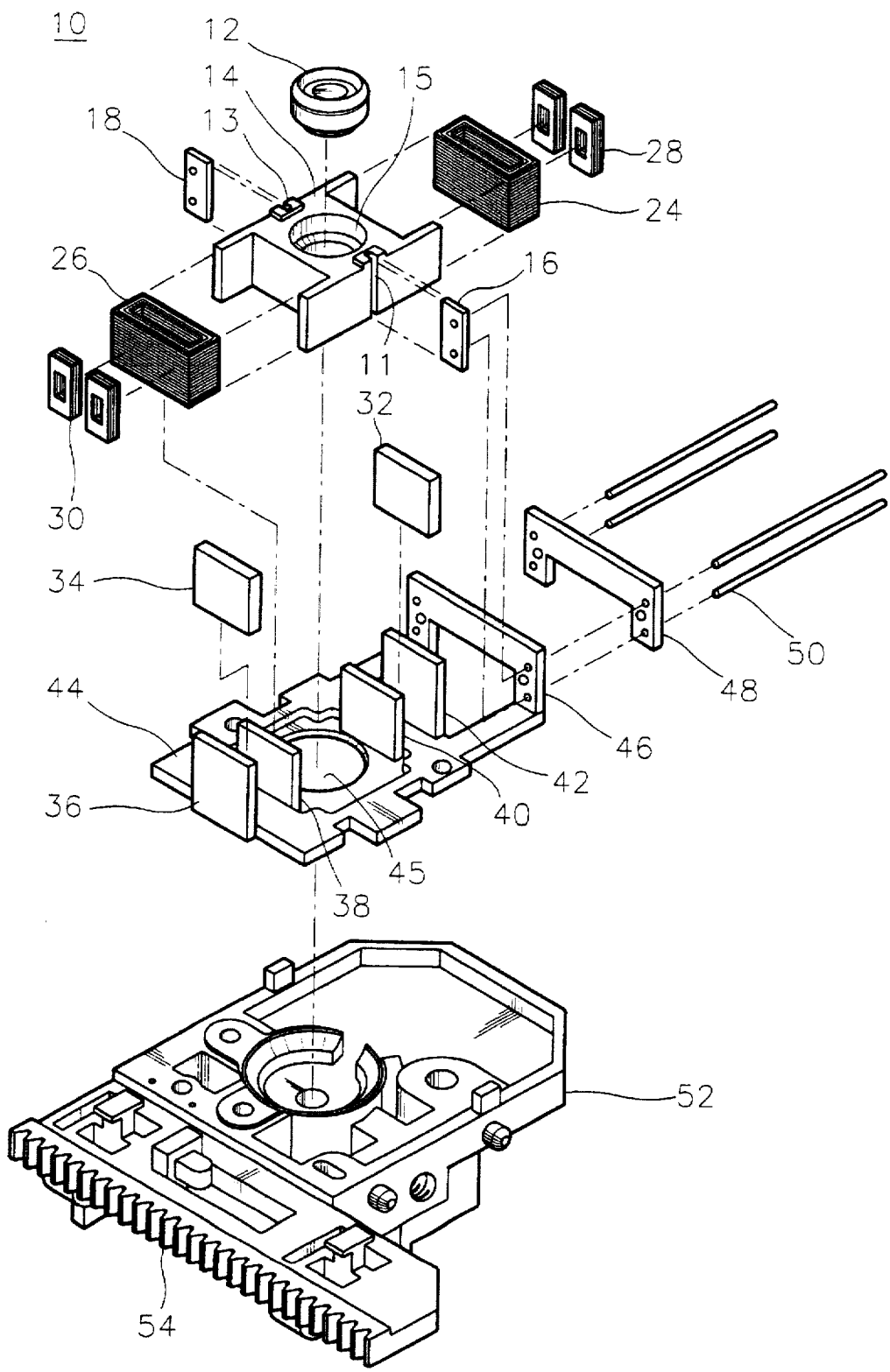
FIG. 1 is an exploded perspective view of a conventional optical pick-up.
Figure 2:
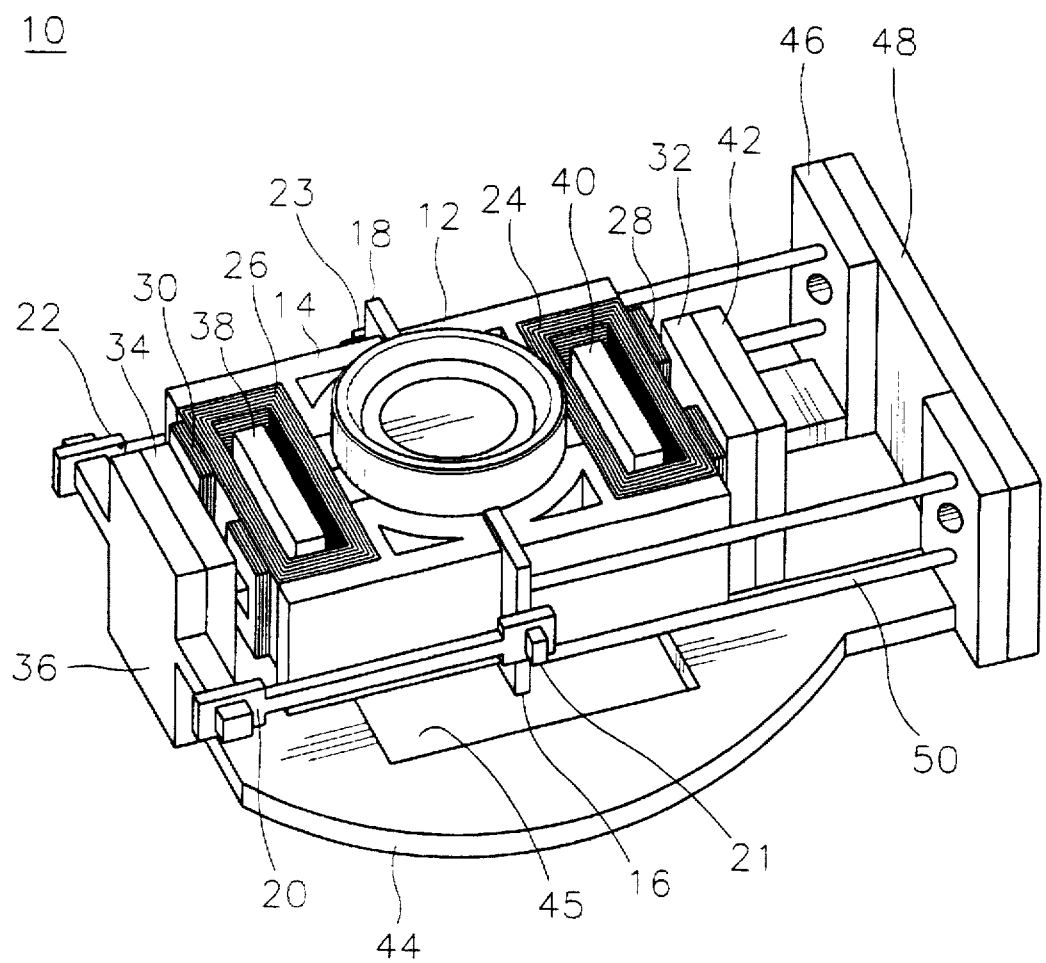
FIG. 2 is a perspective view of the conventional optical pick-up on which dampers are mounted.
Figure 3:
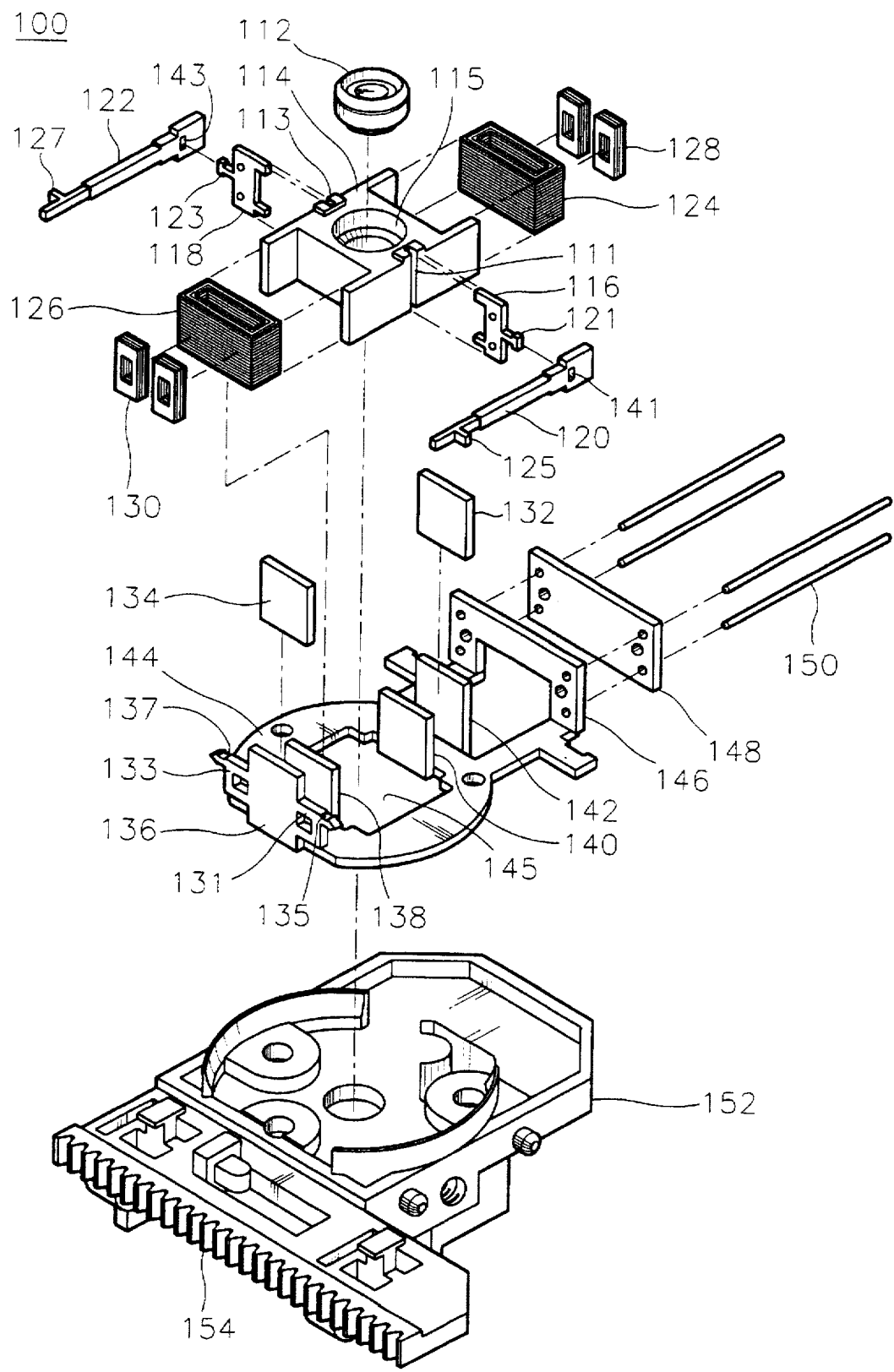
FIG. 3 is an exploded view of an optical pick-up on which dampers are mounted according to a first embodiment of the present invention.

FIG. 3 is an exploded perspective view of an optical pick-up 100 according to a first embodiment of the present invention. As can be seen in the figure, optical pick-up 100 according to the present embodiment includes a holder 114 having an objective lens 112 mounted thereto, an actuator having focusing coils 124 and 126 for driving holder 114 in the focusing direction, tracking coils 128 and 130 for actuating holder 114 in the tracking direction, permanent magnets 132 and 134 for interacting with focusing coils 124 and 126 and tracking coils 128 and 130, and yokes 136, 138, 140 and 142 for providing magnetic paths between focusing coils 124 and 126 and tracking coils 128 and 130. A yoke plate 144 for supporting holder 114 is mounted with focusing coils 124 and 126 and tracking coils 128 and 130 spaced apart from each other by a predetermined interval, in which focusing coils 124 and 126 and tracking coils 128 and 130 perform the focusing and tracking operations of objective lens 112 in cooperation with holder 114. Optical pick-up 100 further includes a first damping section mounted between holder 114 and yoke plate 144 for preventing the vibration of holder 114.

Holder 114 has a first sidewall formed with a first mounting groove 111, a second sidewall formed with a second mounting groove 113 and a central portion formed with a first beam thruhole 115. Objective lens 112 is mounted to first beam thruhole 115. Holder 114 is formed of a metal that conducts electricity.

An actuator has focusing coils 124 and 126 for driving holder 114 in the focusing direction, tracking coils 128 and 130 for actuating holder 114 in the tracking direction, permanent magnets 134 and 132 for interacting with focusing coils 124 and 126 and tracking coils 128 and 130, and yokes 136, 138, 140 and 142 for providing magnetic paths between the focusing coils 124 and 126 and tracking coils 128 and 130.

Damping section has a first support piece 116 mounted into a first mounting groove 111 of holder 114, a second support piece 118 mounted into a second mounting groove 113. A first damper 120 has first end connected to first support piece 116 for absorbing an external shock, and a second damper 122 has one end connected to second support piece 118 for absorbing the external shock. Also, a damping yoke 136 is connected to second ends of the first and second dampers.

First support piece 116 is formed with a first latch 121 at the outer side, and first support holes in the upper and lower ends. Second support piece 118 is formed with a second latch 123 at the outer side, and second support holes in the upper and lower ends.

First damper 120 has a first latching hole 141 in the preceding end, and a first projection 125 from an outer side of a rear end. First damper 120 is shaped to be narrower as it extends from the rear end toward the preceding end. Second damper 122 has a second latching hole 143 in the preceding end, and a second projection 127 from an outer side of a rear end. Second damper 122 is shaped to be narrower as it extends from the rear end toward the preceding end. First and second dampers 120 and 122 are formed by molding an elastic substance such as a rubber or urethane.

Damping yoke 136 is a plate formed with a first shoulder 131 and a second shoulder 133 at the outer side, in which a first projection groove 135 is formed in first shoulder 131 and a second projection groove 137 is formed in second shoulder 133.

First damper 120 is connected to first support piece 116 when first latch 121 of first support piece 116 is inserted into first latching hole 141. Then, first projection 125 is locked into projection groove 135 of damping yoke 136 to be connected to first damping yoke 136. Second damper 122 is connected to second support piece 118 by inserting second latch 123 of second support piece 118 into second latching hole 143. Then, second projection 127 is locked into second projection groove 137 of damping yoke 136 to be connected to first damping yoke 136.

Yoke plate 144 is formed with a second beam thruhole at the center, and has an end plate 148 fixed to its preceding end. A suspension support plate 146 is fixed to yoke plate 144 in the vicinity of end plate 148. Additionally, a first yoke 142 is placed at the rear side of suspension support plate 146 spaced apart from suspension support plate 146 by a predetermined distance. A second yoke 140 is provided around second beam thruhole 145 spaced apart from first yoke 142 by a predetermined distance. A third yoke 138 is installed to be opposite to second yoke 140 centering about second beam thruhole 145. Besides, damping yoke 136 of damping section is installed to the other end of yoke plate 144.

A first permanent magnet 132 is placed between first yoke 142 and second yoke 140 to be adjacent to first yoke 142. A first focusing coil 124 is inserted into second yoke 140, and first tracking coil 128 is placed between first focusing coil 124 and first permanent magnet 132.

In the same manner, a second permanent magnet 134 is disposed between damping yoke 136 and third yoke 138 to be adjacent to damping yoke 136, and second focusing coil 126 is inserted into third yoke 138. Then, second tracking coil 130 is disposed between second focusing coil 126 and second permanent magnet 134.

One ends of suspensions 150 which support holder 114 penetrates through a support hole of a suspension support plate 146 to be fixed to end plate 148, and the other end thereof is inserted into first and second support holes of first and second support piece 116 and 118 to support holder 114.

End plate 148 is a kind of PCB (printed circuit board) which supplies an electrical power to holder 114 via suspensions 150 which is formed by molding a conductive substance.

Once holder 114 is connected to yoke plate 144 by means of first damping section 120 and 122 and suspensions 150 and is supported by yoke plate 144, yoke plate 144 is mounted to base 152 by using a connector such as bolts.

Now, an operation of optical pick-up apparatus 100 according to the embodiment of the present invention will be described.

Figure 4:
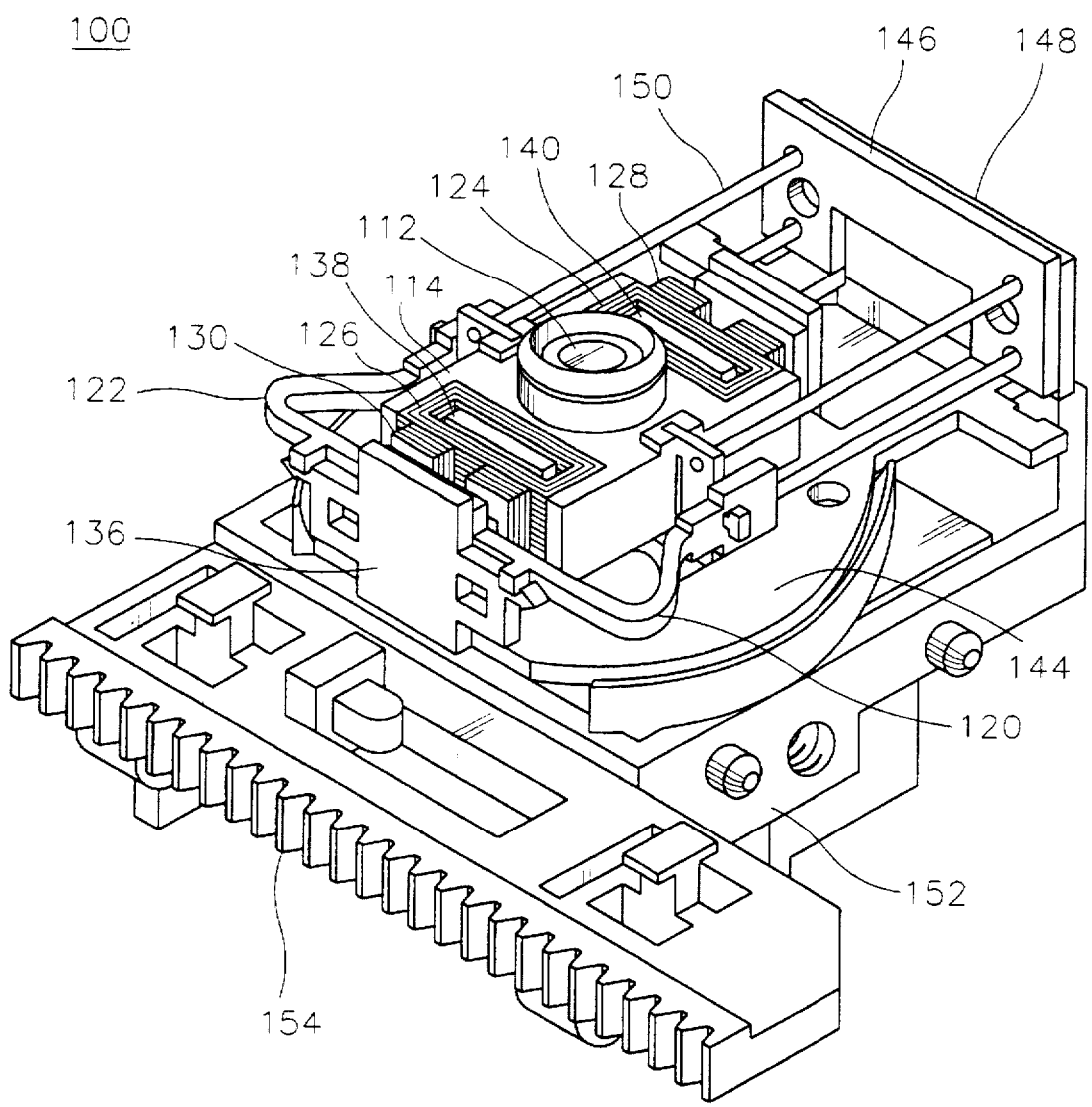
FIG. 4 is a perspective view of the optical pick-up according to the first embodiment of the present invention.

FIG. 4 is the perspective view of the assembled optical pick-up apparatus 100 according to the embodiment of the present invention. Referring to the drawing, a distance between damping yoke 136 and first and second support pieces 116 and 118 is shorter than lengths of first and second dampers 120 and 122. Thus, first and second dampers 120 and 122 are mounted while being bent. As illustrated, first and second dampers 120 and 122 are coupled among first and second support pieces 116 and 118 and damping yoke 136 while being subjected to a compression force, thereby enhancing the driving characteristic of the objective lens.

If an external shock is imposed upon optical pick-up apparatus 100 while being mounted as above, holder 114 mounted with objective lens 112 jolts from side to side and up and down by suspensions 150. First and second dampers 120 and 122 absorb the above-stated vibration energy of holder 114 to attenuate the shaking of holder 114.

Figure 5:
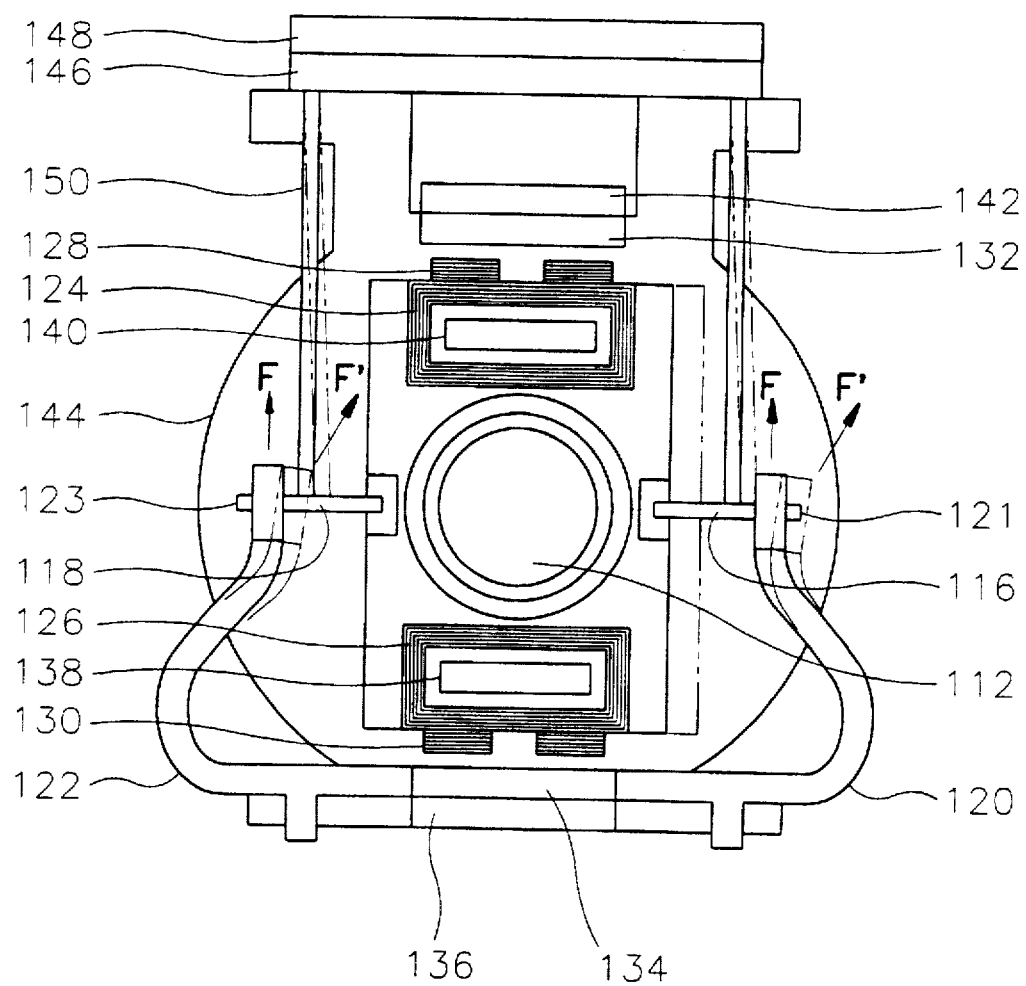
FIG. 5 shows a operational state of an actuator included in the optical pick-up shown in FIG. 4.

FIG. 5 shows the operation of dampers 120 and 122 during the focusing and tracking operations of holder 114. Here, dampers 120 and 122 apply the compression force F upon suspensions 150 in the direction parallel to the axes of suspensions 150 under the state that the electric power is not supplied to holder 114. At this time, holder 114 is supplied with the electric power via suspensions 150, and induction current begins to flow through focusing coils 124 and 126 and tracking coils 128 and 130 to produce an electromagnetic force between focusing coils 124 and 126, tracking coils 128 and 130 and first and second permanent magnets 132 and 134.

Holder 114 connected with first and second dampers 120 and 122 moves in the focusing direction and/or tracking direction by the aforementioned electromagnetic force, and the other ends of suspensions 150 bend in the focusing and/or tracking direction(s) in accordance with the motion of holder 114.

At this time, first and second dampers 120 and 122 are bent in the tracking direction, and the compression force F which has been perpendicularly exerted upon the suspensions acts in the direction F' where the suspensions are bent. As the result, any force generates in the direction normal to the axes of suspensions 150, and is added to the driving force of the actuator. Consequently, suspensions 150 are swiftly bent to accelerate the movement speed in the tracking direction of objective lens 120. As objective lens 120 is moved quickly, the tracking control time of objective lens 120 is shortened.

Embodiment 2

Figure 6:
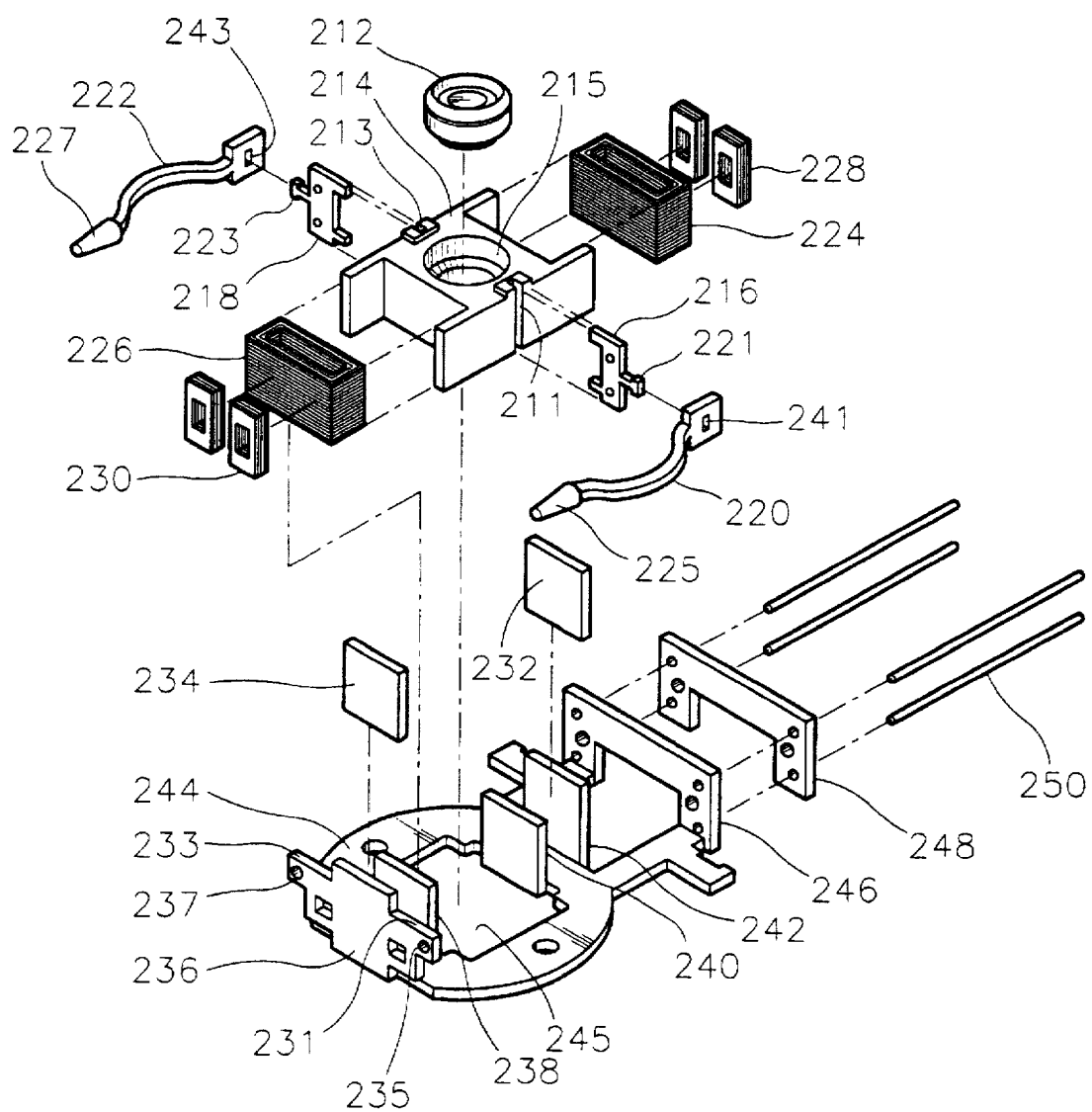
FIG. 6 is an exploded view of the optical pick-up according to a second embodiment of the present invention.

FIG. 6 is an exploded perspective view of an optical pick-up apparatus 200 according to the present embodiment.

In FIG. 6, the members excluding a damping section of optical pick-up apparatus according to the present embodiment are the same as those of Embodiment 1, and a detailed description thereof will not be repeated.

The damping section according to the second embodiment of the present invention includes a first support piece 216 mounted to a first mounting groove 211 of a holder 214, and a second support piece 218 mounted to a second mounting groove 213. Also, a first damper 220 has a first end connected to first support piece 216 for absorbing the external shock, and a second damper 222 has a first end connected to second support piece 218 for absorbing the external shock. In addition to these, the damping section includes a damping yoke 236 connected to second ends of first and second dampers 220 and 222.

A first support piece 216 is provided with a first latch 221 at the outer side, and first support holes in the upper and lower ends. Second support piece 218 is formed with a second latch 223 at the outer side, and second support holes in the upper and lower ends.

First damper 220 is formed with a first latching hole 241 in the preceding end, and a first projection 225 from the outer side of a rear end. First damper 220 is shaped such that a portion connecting the preceding end and rear end is bent, thereby having an arc shape. Fourth damper 222 has a fourth latching hole 243 in the preceding end, and a second projection 227 from the outer side of a rear end. Second damper 222 is shaped such that a portion connecting the preceding end and rear end is bent, thereby having an arc shape. First and fourth dampers 220 and 222 are formed by molding an elastic substance such as a rubber or urethane.

Damping yoke 236 is a plate formed with a first upper edge 231 and a second upper edge 233 at the outer sides, respectively, in which a first projection hole 235 is formed in first upper edge 231 and a second projection hole 237 is formed in second upper edge 233 which is opposite to first upper edge 231.

First damper 220 is connected to first support piece 216 when first latch 221 of first support piece 216 is inserted into first latching hole 241. Then, first projection 225 is inserted into first projection hole 235 of damping yoke 236 to be connected with damping yoke 236. Second damper 222 is connected to second support piece 218 by inserting second latch 223 of second support piece 218 into second latching hole 243. Then, second projection 227 is inserted into second projection hole 237 of damping yoke 236 to be connected to damping yoke 236.

Figure 7:
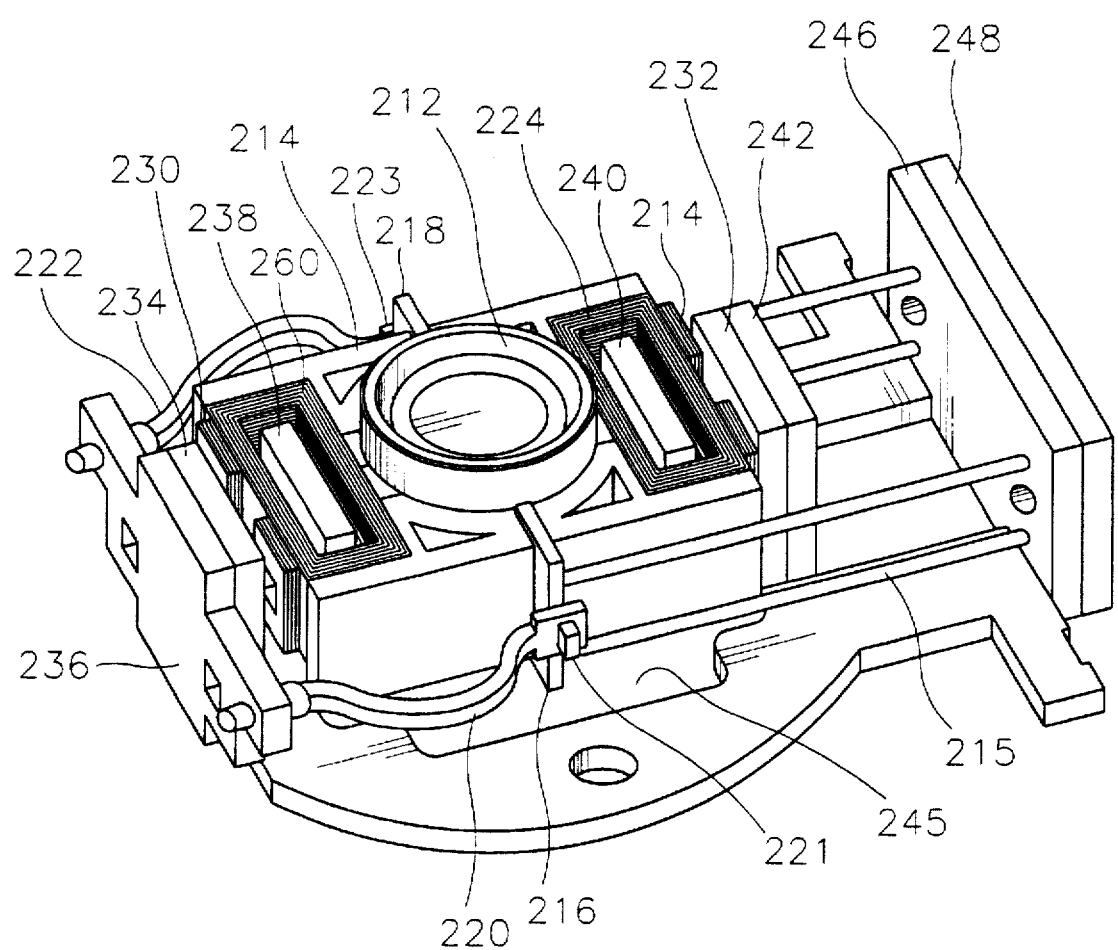
FIG. 7 is a perspective view of the optical pick-up according to the second embodiment of the present invention.

FIG. 7 is the perspective view of the assembled optical pick-up apparatus 200 according to the present embodiment. Referring to the drawing, first and second dampers 220 and 222 are coupled among first and second support pieces 216 and 218 and second damping yoke 236 while being subjected to a compression force, thereby enhancing the driving characteristic of the objective lens.

Figure 8:
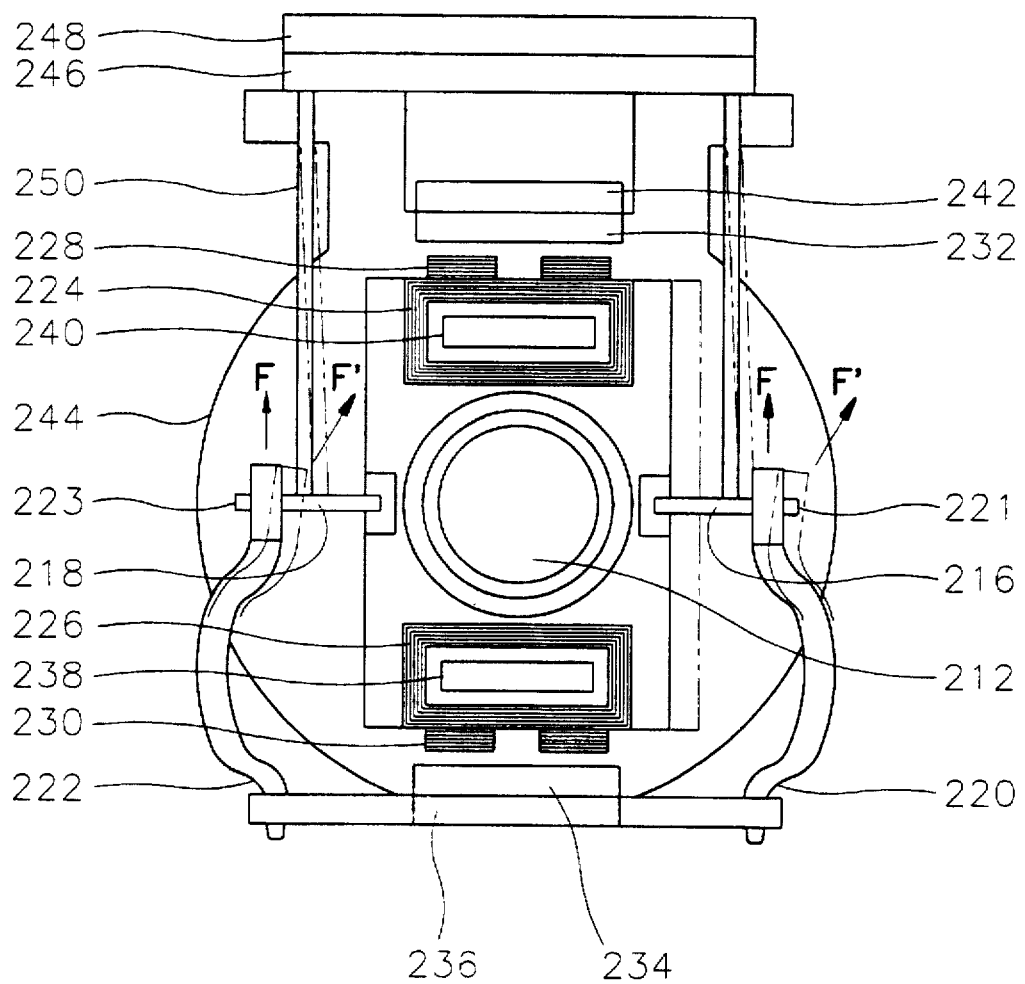
FIG. 8 shows an operational state of the actuator included in the optical pick-up shown in FIG. 7.

FIG. 8 shows the operation state of actuator of optical pick-up apparatus 200 according to the present embodiment. An operation of optical pick-up according to the present embodiment is the same as that according to the first embodiment when first damper 120 and second damper 122 of the optical pick-up according to the first embodiment are respectively replaced with first damper 220 and second according to the second embodiment, and any more detailed descriptions thereof will thus be omitted.

As the present invention has been described herein with reference to the embodiments, the optical pick-up apparatus according to the present invention allows for easy assembling work and efficient prevention of external shock.

Furthermore, in the optical pick-up apparatus according to the present invention, the driving force of the objective lens can be reinforced without increasing the winding numbers of the focusing coil and tracking coil and dimensions of the optical pick-up.

While the present invention has been particularly shown and described with reference to the particular embodiments thereof, it will be understood by those skilled in the art that various changes in form and details may be effected therein without departing from the spirit and scope of the invention as defined by the appended claims.

What is claimed is:

1. An optical pick-up apparatus comprising:

a holder formed with a first beam thruhole and having first and second vertical mounting grooves defined in both sides, the first beam thruhole being for mounting an objective lens therein;

an actuator having focusing coils for driving the holder in a focusing direction, tracking coils for actuating the holder in a tracking direction, permanent magnets for interacting with said focusing coils and said tracking coils, and yokes for providing magnetic paths between the focusing coils and tracking coils;

a yoke plate having a second beam thruhole at least partially aligned with the first beam thruhole and supporting the focusing coils and the tracking coils mounted on an upper plane thereof spaced apart from each other by a predetermined distance, said yoke plate including a suspension support plate and a damping yoke;

suspensions for supporting said holder, said suspensions being engaged with said suspension support plate of the yoke plate at one end thereof and connected to said holder at the other end thereof; and a damping means for applying compressed force to said suspensions and for preventing the holder from being vibrated, said damping means being mounted between the holder and said damping yoke of the yoke plate, wherein said holder is disposed intermediate said suspension support plate and said damping yoke, and said damping means absorbs an impact transmitted to the holder due to an external force.

2. An optical pick-up apparatus as claimed in claim 1, said damping means comprising;

a first support piece having a first latch at a center of one side, said first support piece being mounted into said first vertical mounting groove;

a second support piece having a second latch at the center of one side, said second support piece being mounted into said second vertical mounting groove;

said damping yoke comprising a first damping yoke having a first projection groove at an upper end of one side and a second projection groove at an upper end of other side, said damping yoke being secured to one end of the yoke plate;

a first damper being formed with a first latching hole at a first end, and a first projection at a second end; and a second damper being formed with a second latching hole at a first end, and a second projection at a second end, wherein the first latch is inserted into the first latching hole of said first damper, said first projection is connected with the first projection groove, said second latch is inserted into the second latching hole of said second damper, and said second projection is connected with the second projection groove.

3. An optical pick-up apparatus as claimed in claim 2, wherein said first and second dampers have a shape such that widths of said first and second dampers increase in a length direction thereof from each end of said first and second dampers.

4. An optical pick-up apparatus as claimed in claim 2, wherein said first damper has a bent shape while being mounted between said first support piece and the first projection groove, and said second damper has a bent shape while being mounted between said second support piece and the second projection groove.

5. An optical pick-up apparatus as claimed in claim 2, wherein said first and second dampers are comprised of rubber.

6. An optical pick-up apparatus as claimed in claim 1, wherein said damping means comprises a first support piece engaged with said first vertical mounting groove;

a second support piece engaged with said second vertical mounting groove;

a first damper having first and second ends, said first end being engaged with said first support piece, and said second end defining a first projection; and a second damper having first and second ends, said first end being engaged with said second support piece, and said second end defining a second projection, wherein said damping yoke defines first and second protection holes, and said first projection is at least partially received in the first projection hole of said damping yoke and said second projection is at least partially received in the second projection hole of said damping yoke.

7. An optical pick-up apparatus as claimed in claim 6, wherein said first and second dampers have an arc shape.

8. An optical pick-up apparatus as claimed in claim 6, wherein said first and second dampers are comprised of rubber.

9. An optical pick-up apparatus comprising:

a holder formed with a first beam thruhole and having first and second vertical mounting grooves defined at both sides, said first beam thruhole being for mounting an objective lens therein;

an actuator having focusing coils for driving the holder in a focusing direction, tracking coils for actuating the holder in a tracking direction, permanent magnets for interacting with the focusing coils and the tracking coils, and yokes for providing magnetic paths between the focusing coils and tracking coils;

a yoke plate having a second beam thruhole at least partially aligned with said first beam thruhole and supporting said focusing coils and said tracking coils on an upper plane thereof spaced apart from each other by a predetermined distance, said yoke plate including a suspension support plate and a damping yoke, said damping yoke defining first and second projection holes;

suspensions for supporting said holder, said suspensions being engaged with said suspension support plate of said yoke plate at one end thereof, and connected to said holder at the other end thereof;

a first support piece engaged with said first vertical groove of said holder, a second support piece engaged with said second vertical groove of said holder, a first damping member formed of a rubber substance and having an arc shape, a first end and a second end, said first end being engaged with said first support piece and said second end defining a first projection, a second damping member formed of said rubber substance and having an arc shape, a first end and a second end, said first end being engaged with said second support piece and said second end defining a second projection, wherein said holder is disposed intermediate said suspension support plate and said damping yoke, and said first projection is at least partially received in the first projection hole and said second projection is at least partially received in the second projection hole.

* * * * *